United States Patent [19]

Schadow

[11] 4,052,846
[45] Oct. 11, 1977

[54] BAFFLED COMBUSTION CHAMBER
[75] Inventor: Klaus Schadow, Ridgecrest, Calif.
[73] Assignee: The United States of America as represented by the Secretary of the Navy, Washington, D.C.
[21] Appl. No.: 647,524
[22] Filed: Jan. 8, 1976
[51] Int. Cl.² ............................................. F02K 9/04
[52] U.S. Cl. ................................... 60/251; 60/270 S
[58] Field of Search ................. 60/270 S, 251, 253, 60/255, 254, 256, 39.47

[56] References Cited
U.S. PATENT DOCUMENTS

| | | | |
|---|---|---|---|
| 2,684,629 | 7/1954 | Nordfors | 60/270 S |
| 2,799,987 | 7/1957 | Chandler | 60/270 S |
| 3,279,187 | 10/1966 | Lindman | 60/256 |
| 3,357,187 | 12/1967 | Whitlock | 60/270 S |
| 3,535,881 | 10/1970 | Schubert | 60/270 S |
| 3,786,633 | 1/1974 | Worcester | 60/256 |
| 3,951,072 | 4/1976 | Baker | 60/253 |

Primary Examiner—Carlton R. Croyle
Assistant Examiner—Robert E. Garrett
Attorney, Agent, or Firm—R. S. Sciascia; Roy Miller

[57] ABSTRACT

An apparatus to improve combustion efficiency of solid fueled ramjets by reducing or slowing down the mixing between the air stream and the combustion zone near the fuel grain. The mixing process is altered by placing a control device parallel to the longitudinal axis of the combustion chamber and spaced from the interior wall of the solid fuel. The device may take the form of a co-axial tube which may be perforated slotted or segmented.

3 Claims, 3 Drawing Figures

BAFFLED COMBUSTION CHAMBER

BACKGROUND OF THE INVENTION

The present invention relates to solid fuel ramjets and particularly to apparatus for combustion efficiency of a ramjet engine.

Previously only path length and amount of air intake were varied. This restricted the internal operation to a single burning configuration. Since fuel combustion and nozzle exhaust are not optimized at the same air temperature and volume there was an inherent inefficiency.

SUMMARY

The use of a baffle to divide the air stream permits different air-to-fuel ratios to exist at the fuel surface and nozzle area. This improves combustion efficiency in the ramjet.

DESCRIPTION AND OPERATION

Figure 1:
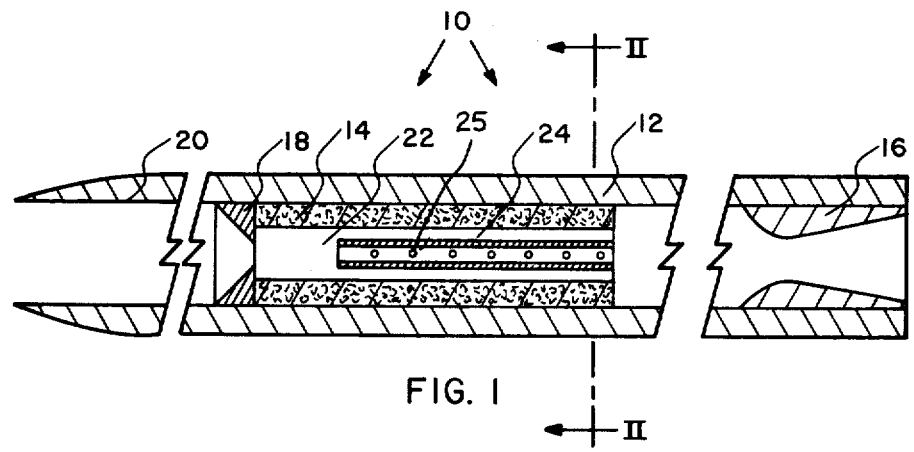
FIG. 1 is a longitudinal cross sectional view of a solid fuel ramjet manufactured according to the present invention.
Figure 2:
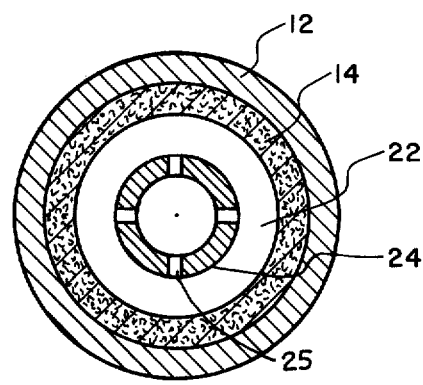
FIG. 2 is a transverse cross sectional view taken along line II-II in FIG. 1.

A solid fueled ramjet is generally indicated by numeral 10 in FIG. 1 and comprises a casing 12, a solid fuel 14, and an exit nozzle 16. A flame holding injector 18 is placed forward of the fuel 14 and air is admitted from the air intake 20 through injector 18 to the combustion chamber 22. According to the present invention, a perforate baffle 24 is placed within the combustion chamber and spaced from the solid fuel to control the mixing between the air flow and the combustion zone near the fuel grain. As shown in FIGS. 1 and 2 the baffle may take the form of a co-axial tube having perforations or slots as shown at 25.

The technique utilized in arriving at possible baffle configurations includes combustion tests of solid fueled ramjets in a windowed combustion tunnel. These tests prove the feasability of observing combustion processes in the solid fueled ramjets through quartz windows and developed a test technique to improve combustion efficiency by reducing or slowing down the mixing between the airstream and the combustion gases in the zone near the fuel grain. These tests resulted in the widening of the high combustion temperature region, thus initiating more intensive reactions before mixing (and cooling) of the reaction products occurs with the remaining air mass flow.

Figure 3:
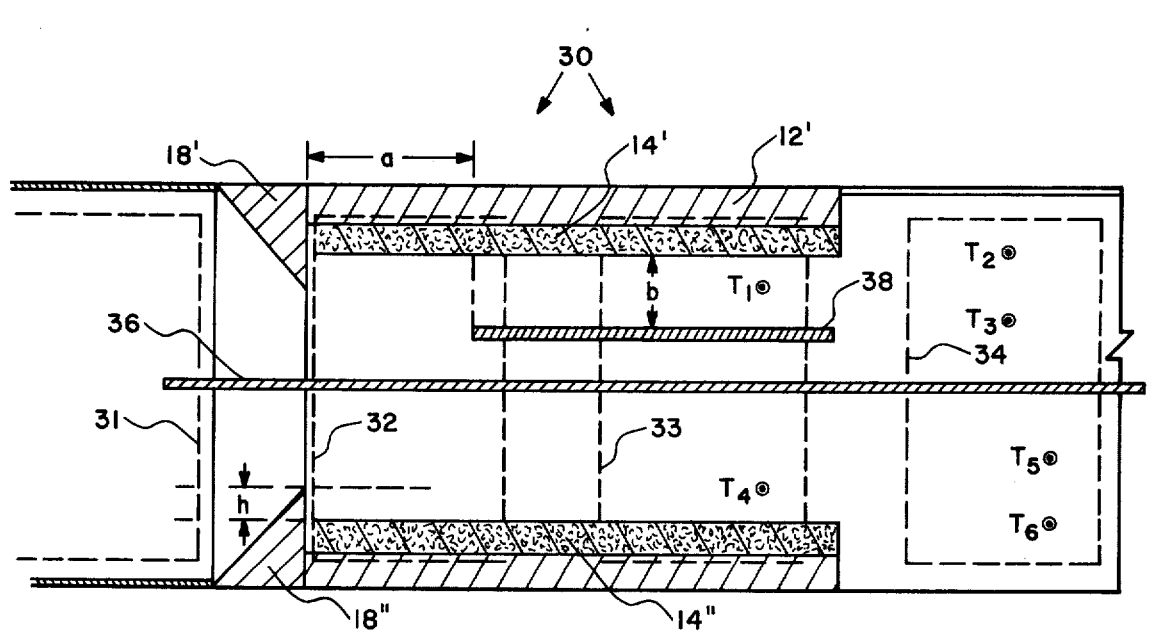
FIG. 3 is a schematic diagram of the test facility.

A schematic diagram of the test facility is shown in FIG. 3. A test tunnel section 30 is provided with windows 31, 32, 33 and 34 to allow observation of the combustion in progress. The test section is provided with fuel grains 14' and 14". Injector plate numbers 18' and 18" having a step height $h$ are placed on the top and bottom of the chamber. A divider plate 36 is placed between the fuel grains through the center of the combustion tunnel producing two identical combustion chamber sections on the top and bottom. In the top section, a second plate 38 is placed parallel to the divider plate for controlling the mixing process. Varying the position and length of this control plate is described by '$a$' and '$b$', the dimension '$a$' representing the distance between the forward end of baffle plate 38 and the aft end of the top injector plate 18' and the dimension '$b$' representing the distance of baffle plate 38 from the grain section 14'. To achieve sustained combustion of the fuel grain, ethylene was injected into the combustion chamber for 3 seconds. The ethylene was then ignited and the combustion process observed by color photography at 400 frames per second while temperature measurements were made at six locations $t_1$-$t_6$. The important test parameters and results of the temperature sensors and pictures are shown in the following table.

TABLE

| No. | a in | b in | h in | $m_{air}$ lb/sec | $T_{air}$ °k | $\frac{m_{air}}{m_{fuel}}$ | $P_c$ psia | $T_1$ °K | $T_2$ °K | $T_3$ °K | $T_4$ °K | $T_5$ °K | $T_6$ °K |
|---|---|---|---|---|---|---|---|---|---|---|---|---|---|
| 1 | 1 | 1.0 | 0.75 | 1.7 | 500 | 33 | 78 | 1560 | 1540 | 1540 | 1800 | 1120 | 1320 |
| 2 | 3 | 1.0 | 0.75 | 1.7 | 500 | 33 | 78 | 1620 | 1620 | 1440 | 1760 | 1260 | 1360 |
| 3 | 3 | 1.4 | 0.50 | 2.1 | 500 | 40 | 56 | 1580 | 1680 | 1780 | 1840 | 1020 | 1080 |
| 4 | 3 | 1.4 | 0.50 | 2.6 | 500 | 50 | 53 | 1320 | 1260 | 1760 | 1260 | 960 | 800 |
| 5 | 3 | 1.4 | 0.50 | 2.7 | 500 | 52 | 50 | 1400 | 1460 | 1600 | 1400 | 940 | 960 |
| 6 | 3 | 1.4 | 0.25 | 2.6 | 500 | | | No sustained burning | | | | | |

Remarks
1. Yellowish-brownish flame in combustion chamber section between upper fuel-grain and plate for controlled mixing. Whitish flame above the surface of lower fuel grain.
2. Same as above.
3. Both combustion zones (from the upper and lower fuel grain) are whitish. Strong burning continues at least 5 inches downstream of end of both fuel grains (flame continues beyond windowed chamber section).
4. Film overexposed (wrong exposure time.) Both combustion zones are whitish; however, flame from lower fuel grain extinguished shortly downstream of end of fuel grain (no flame at position of $T_4$ and $T_6$), while strong burning extends at least 5 inches downstream of end of upper fuel grain, that is beyond windowed chamber section.
5. Both combustion zones are whitish. Combustion zone from upper grain continues beyond windowed chamber section. Zone from lower fuel grain extinguished in third window.

The influence of the baffle device on the combustion process can be seen by comparing the corresponding temperatures and flame characteristics in the lower and upper combustion chamber sections. The specific plate position in test 1 obviously prevents sufficient air flow to the combustion zone near the upper fuel grain. The combustion temperatures in the upper sections are lower than in the lower section. The brownish flame observed in the upper section also indicated a lack of oxygen in the combustion zone. To increase the air mass flow to the combustion zone in the upper chamber section, the leading edge of the plate was moved further downstream. That is the "a" dimension was increased. Also, the height of the combustion chamber section between the upper fuel grain and the plate was increased in test 3. Also in test 3, the step height of the injector plate was decreased from 0.75 inches to 0.5 inches. In test 4, the air mass flow was increased from 1.7 pounds per seconds in test 1 to 2.6 pounds per second in test 4. These changes resulted in the test conditions of test 4, with an air-to-fuel ratio $m_{air}/m_{fuel}$ 50 corresponding to an equivalence ratio $$\frac{m_{fuel}/m_{air}}{(m_{fuel}/m_{air})_{STOICH}} = \frac{0.2}{0.77} = 0.26$$

Generally, tests under these conditions have shown low combustion efficiency with axi-symmetric grains. Low combustion efficiency is also indicated in test 4 in the lower chamber section (i.e., low combustion temperatures and flame extinguished near the end of the fuel grain). Under the same conditions, the combustion efficiency was improved by use of the control plate for reducing or slowing down mixing in the upper chamber section. Note the higher combustion temperatures and the extended combustion region downstream of the fuel grain.

Test 5 was made under similar conditions to that of test 4 but the improved combustion characteristics in the upper chamber section are not as drastic as in test 4. When the step height was decreased to 0.25 inches, for example, in test 6, no sustained burning was achieved. Because the present invention extends the high temperature combustion zone, sufficient temperatures and residence times should be available to heat the particles of metal or boron loaded propellants to a temperature necessary for rapid combustion in the air stream. The air intake is divided by the baffle. The air stream outside the baffle creates a low air-to-fuel ratio compatible with a high combustion temperature. At this higher temperature any char that develops on the fuel will burn away and not inhibit combustion. Further, fuels such as boron or particles of metal that require higher combustion temperature can be used.

The remixing of the two air streams again changes the air to fuel ratio. The higher ratio permits the final stages of combustion to occur at a lower temperature prior to exiting the nozzle area.

What is claimed is:

1. In a solid fuel ramjet engine having a combustion chamber defined between a forward injector plate, which contains an air inlet to enable the passage of ram air into the engine and to act further as a flame retarder, and an after nozzle and surrounded by a solid fuel grain, the improvement comprising:
    baffle means fastened within said chamber between said injector plate and a point near the aft end of said grain; and
    said baffle extending from said point near the aft end of said fuel grain to a point spaced from said injector plate and comprising interposing baffle surfaces between the inner surface of said grain and longitudinal axis of said chamber, 2. Apparatus according to claim 1 in which said baffle is a perforated tube.

3. Apparatus according to claim 1 wherein said baffle means comprises a metal tube extending from the rear portion of said grain to a point spaced from said injector plate and fastened along the longitudinal axis of said chamber with the surfacee of said tube being spaced from said grain by a predetermined distance to control the mixing between the air stream and the combustion zone near the fuel grain.

* * * * *